(12) United States Patent
Osnato et al.

(10) Patent No.: US 7,874,918 B2
(45) Date of Patent: Jan. 25, 2011

(54) GAME UNIT WITH MOTION AND ORIENTATION SENSING CONTROLLER

(75) Inventors: Jeffrey Osnato, Cranford, NJ (US); Nicholas Howard, Long Beach, CA (US)

(73) Assignee: Mattel Inc., El Segundo, CA (US)

( * ) Notice: Subject to any disclaimer, the term of this patent is extended or adjusted under 35 U.S.C. 154(b) by 1118 days.

(21) Appl. No.: 11/592,748

(22) Filed: Nov. 3, 2006

(65) Prior Publication Data

US 2007/0111779 A1 May 17, 2007

Related U.S. Application Data

(60) Provisional application No. 60/733,593, filed on Nov. 4, 2005.

(51) Int. Cl.
*A63F 9/24* (2006.01)
*A63F 13/00* (2006.01)
*G06F 17/00* (2006.01)
*G06F 19/00* (2006.01)

(52) U.S. Cl. ............... 463/36; 463/5; 463/8; 463/37; 463/39; 273/148 B; 341/20; 345/156; 345/158

(58) Field of Classification Search ............... None
See application file for complete search history.

(56) References Cited

U.S. PATENT DOCUMENTS

| | | | |
|---|---|---|---|
| 4,695,953 A | | 9/1987 | Blair et al. |
| 4,758,691 A | | 7/1988 | De Bruyne |
| 4,846,693 A | | 7/1989 | Baer |
| 4,850,591 A | | 7/1989 | Takezawa et al. |
| 4,904,222 A | * | 2/1990 | Gastgeb et al. ............ 446/405 |
| 4,925,189 A | | 5/1990 | Braeunig |
| RE33,662 E | | 8/1991 | Blair et al. |
| 5,174,759 A | | 12/1992 | Preston et al. |
| 5,178,545 A | | 1/1993 | Thompson |
| 5,232,223 A | * | 8/1993 | Dornbusch ............ 463/37 |
| 5,239,464 A | | 8/1993 | Blair et al. |
| 5,288,078 A | * | 2/1994 | Capper et al. ............ 463/39 |

(Continued)

FOREIGN PATENT DOCUMENTS

WO    WO 2004087271    10/2004

(Continued)

*Primary Examiner*—John M. Hotaling, II
*Assistant Examiner*—Paul A. D'Agostino
(74) *Attorney, Agent, or Firm*—Kolisch Hartwell, P.C.

(57) ABSTRACT

An electronic game apparatus for providing a game activity on a monitor device. The electronic game apparatus may include a contacting member and a signal-emitting member that are each adapted to be manipulated by a user. The signal-emitting member may include a kinetic sensor adapted to produce a kinetic control signal representative of at least an orientation of the signal-emitting member. The signal-emitting member may also include at least one contact sensor adapted to be actuated by the user pressing the contacting member against the signal-emitting member to produce a contact control signal. A processor may be responsive to the kinetic control signal and the contact control signal and adapted to determine the game activity corresponding thereto. An audio-video processor adapted to produce and transmit audio-video output signals representative of the game activity to the monitor device may be coupled to the processor.

22 Claims, 4 Drawing Sheets

U.S. PATENT DOCUMENTS

| | | | |
|---|---|---|---|
| 5,311,207 A | 5/1994 | Kusumoto et al. | |
| 5,354,057 A * | 10/1994 | Pruitt et al. | 463/5 |
| 5,414,256 A | 5/1995 | Gurner et al. | |
| 5,442,168 A | 8/1995 | Gurner et al. | |
| 5,453,758 A | 9/1995 | Sato | |
| 5,459,312 A | 10/1995 | Gurner et al. | |
| 5,475,214 A | 12/1995 | DeFranco et al. | |
| 5,511,983 A | 4/1996 | Kashii et al. | |
| 5,516,105 A * | 5/1996 | Eisenbrey et al. | 273/148 B |
| 5,542,672 A | 8/1996 | Meredith | |
| D375,326 S | 11/1996 | Yokoi et al. | |
| 5,594,215 A | 1/1997 | Jeng | |
| 5,616,078 A * | 4/1997 | Oh | 463/8 |
| 5,668,574 A | 9/1997 | Jarlance-Huang | |
| 5,670,992 A | 9/1997 | Yasuhara et al. | |
| 5,730,655 A * | 3/1998 | Meredith | 463/37 |
| 5,732,953 A | 3/1998 | Tamura | |
| 5,741,182 A | 4/1998 | Lipps et al. | |
| 5,751,273 A | 5/1998 | Cohen | |
| 5,833,549 A | 11/1998 | Zur et al. | |
| 5,913,727 A | 6/1999 | Ahdoot | |
| 5,963,199 A | 10/1999 | Kato et al. | |
| 5,967,898 A | 10/1999 | Takasaka et al. | |
| 6,025,830 A | 2/2000 | Cohen | |
| 6,028,593 A | 2/2000 | Rosenberg et al. | |
| 6,068,554 A | 5/2000 | Tyler | |
| 6,162,120 A | 12/2000 | Takahashi et al. | |
| 6,162,123 A | 12/2000 | Woolston | |
| 6,191,777 B1 | 2/2001 | Yasuhara et al. | |
| 6,201,947 B1 | 3/2001 | Hur et al. | |
| 6,225,977 B1 | 5/2001 | Li | |
| 6,227,974 B1 | 5/2001 | Eilat et al. | |
| 6,312,335 B1 | 11/2001 | Tosaki et al. | |
| 6,319,121 B1 | 11/2001 | Yamada et al. | |
| 6,328,651 B1 * | 12/2001 | Lebensfeld et al. | 463/52 |
| 6,354,948 B1 * | 3/2002 | Nagayama | 463/43 |
| 6,517,438 B2 * | 2/2003 | Tosaki et al. | 463/37 |
| 6,565,438 B2 * | 5/2003 | Ogino | 463/37 |
| 6,575,837 B1 * | 6/2003 | Weske et al. | 463/47.1 |
| 6,607,437 B2 | 8/2003 | Casey et al. | |
| 6,623,358 B2 | 9/2003 | Harima | |
| 6,645,070 B2 | 11/2003 | Lupo | |
| 6,761,637 B2 | 7/2004 | Weston et al. | |
| 6,805,631 B2 | 10/2004 | Izumi | |
| 6,809,722 B2 | 10/2004 | Mei et al. | |
| 6,878,062 B2 | 4/2005 | Björklund et al. | |
| 6,902,482 B1 | 6/2005 | Woolston | |
| 6,929,543 B1 * | 8/2005 | Ueshima et al. | 463/7 |
| 6,955,603 B2 | 10/2005 | Jeffway, Jr. et al. | |
| 7,001,272 B2 * | 2/2006 | Yamashita et al. | 463/7 |
| 7,084,855 B2 * | 8/2006 | Kaku et al. | 345/158 |
| 7,500,917 B2 * | 3/2009 | Barney et al. | 463/37 |
| 7,618,323 B2 * | 11/2009 | Rothschild et al. | 463/37 |
| 2001/0018359 A1 | 8/2001 | Izumi | |
| 2001/0024973 A1 * | 9/2001 | Meredith | 463/36 |
| 2002/0004422 A1 | 1/2002 | Tosaki et al. | |
| 2002/0072410 A1 * | 6/2002 | Tanaka et al. | 463/37 |
| 2003/0022717 A1 | 1/2003 | Bjorklund et al. | |
| 2003/0036417 A1 | 2/2003 | Ueshima | |
| 2004/0046736 A1 * | 3/2004 | Pryor et al. | 345/156 |
| 2004/0048666 A1 * | 3/2004 | Bagley et al. | 463/39 |
| 2004/0063481 A1 * | 4/2004 | Wang | 463/8 |
| 2004/0092311 A1 * | 5/2004 | Weston et al. | 463/42 |
| 2004/0155865 A1 | 8/2004 | Swiader | |
| 2004/0166936 A1 | 8/2004 | Rothschild et al. | |
| 2004/0166937 A1 | 8/2004 | Rothschild et al. | |
| 2004/0178576 A1 * | 9/2004 | Hillis et al. | 273/148 B |
| 2004/0204240 A1 | 10/2004 | Barney | |
| 2004/0224602 A1 | 11/2004 | Kislevitz et al. | |
| 2004/0259638 A1 | 12/2004 | Kramer et al. | |
| 2005/0014542 A1 * | 1/2005 | Ueshima | 463/8 |
| 2005/0026703 A1 * | 2/2005 | Fukawa | 463/51 |
| 2005/0085298 A1 * | 4/2005 | Woolston | 463/37 |
| 2005/0143173 A1 | 6/2005 | Barney et al. | |
| 2005/0159206 A1 | 7/2005 | Bjorklund et al. | |
| 2005/0176485 A1 | 8/2005 | Ueshima | |
| 2005/0261073 A1 | 11/2005 | Farrington, Jr. et al. | |
| 2005/0272502 A1 | 12/2005 | Marks | |
| 2006/0205503 A1 * | 9/2006 | Miura et al. | 463/36 |

FOREIGN PATENT DOCUMENTS

| | | |
|---|---|---|
| WO | WO 2006039339 | 4/2006 |

* cited by examiner

Fig. 5

| KINETIC CONTROL SIGNAL 94 | CONTROL SIGNALS 44 | | GAME ACTIVITY 150 |
|---|---|---|---|
| | CONTACT CONTROL SIGNAL 100 | TOUCH CONTROL SIGNAL 104 | |
| GENERALLY UPRIGHT, STILL | NON-ACTUATED | NON-ACTUATED | PLAYER CHARACTER MOTIONLESS WITH SWORDS IN UPRIGHT, READY POSITION |
| SWINGING DOWNWARD | NON-ACTUATED | NON-ACTUATED | SLASHING MOTION WITH SWORD BY PLAYER CHARACTER |
| GENERALLY UPRIGHT | ACTUATED | NON-ACTUATED | PLAYER CHARACTER WILL CROSS SWORDS TO DEFEND AGAINST OPPONENT ATTACKS |
| GENERALLY UPRIGHT | ACTUATED, AT SUBSTANTIALLY MOMENT OF OPPONENT ATTACK | NON-ACTUATED | PLAYER CHARACTER WILL CROSS SWORDS TO DEFEND AGAINST OPPONENT ATTACKS, AND LEAVE OPPONENT CHARACTER VULNERABLE TO ATTACK BY THE PLAYER CHARACTER |
| SWINGING DOWNWARD | NON-ACTUATED | ACTUATED | SPECIAL OFFENSIVE ATTACK MANEUVER |
| GENERALLY UPRIGHT | NON-ACTUATED | ACTUATED | SPECIAL ACTIONS SUCH AS PICKING UP OR USING SPECIAL OBJECT OR CALLING UPON PARTNER CHARACTER TO JOIN ATTACK |

# GAME UNIT WITH MOTION AND ORIENTATION SENSING CONTROLLER

RELATED APPLICATIONS

The present application claims the benefit of U.S. Provisional Patent Application Ser. No. 60/733,593, filed on Nov. 4, 2005, the complete disclosure of which is hereby incorporated by reference herein in its entirety and for all purposes.

TECHNICAL FIELD

The present disclosure relates to electronic game apparatus, and more particularly to electronic game apparatus that are connected to an audio-video monitor such as a television set, in which one or more participants interact with one or more controllers that each include one or more kinetic sensors such as motion and/or orientation sensing elements, one or more contact switches, and/or one or more touch switches, and to the methods of gameplay with these apparatus.

BACKGROUND OF THE DISCLOSURE

An electronic game apparatus may include one or more controller units that may be manipulated by one or more participants in order to simulate a game activity. Examples of electronic game assemblies using electronic inputs, controllers for video games or other computing devices, and/or mechanical combat or fighting games are found in U.S. Pat. Nos. 4,695,953; 4,758,691; 4,846,693; 4,850,591; 4,925,189; 5,174,759; 5,178,545; 5,232,223; 5,239,464; 5,288,078; 5,311,207; 5,414,256; 5,442,168; 5,453,758; 5,459,312; 5,475,214; 5,511,983; 5,516,105; 5,542,672; 5,594,215; 5,668,574; 5,670,992; 5,730,655; 5,732,953; 5,741,182; 5,751,273; 5,913,727; 5,963,199; 5,967,898; 6,025,830; 6,028,593; 6,068,554; 6,162,120; 6,162,123; 6,191,777; 6,201,947; 6,225,977; 6,227,974; 6,312,335; 6,319,121; 6,517,438; 6,607,437; 6,623,358; 6,645,070; 6,761,637; 6,805,631; 6,809,722; 6,878,062; 6,902,482; 6,929,543; 6,955,603; and 7,001,272, in U.S. Reissue Pat. No. RE33662, in U.S. Design Pat. No. D375326, in U.S. Patent Application Publication Nos. 2001/0018359; 2002/0004422; 2003/0022717; 2003/0036417; 2004/0048666; 2004/0155865; 2004/0166936; 2004/0166937; 2004/0204240; 2004/0224602; 2004/0259638; 2005/0085298; 2005/0143173; 2005/0159206; 2005/0176485; 2005/0261073; and 2005/0272502, and in PCT Patent Application Publication Nos. W004087271 and W006039339. The entire disclosures of each of the patents, patent applications, and patent application publications recited in this and in other paragraphs are all incorporated by reference herein in their entirety and for all purposes.

SUMMARY OF THE DISCLOSURE

An electronic game apparatus for providing a game activity on a monitor device may include a contacting member and a signal-emitting member that are each adapted to be manipulated by a user. The signal-emitting member may include one or more kinetic sensors adapted to produce kinetic control signals representative of at least an orientation of the signal-emitting member. The signal-emitting member may also include at least one contact sensor adapted to be actuated by the user pressing the contacting member against the signal-emitting member to produce a contact control signal. A processor may be responsive to the kinetic control signals and the contact control signal and adapted to determine the game activity corresponding thereto. An audio-video processor adapted to produce and transmit audio-video output signals representative of the game activity to the monitor device may be coupled to the processor.

BRIEF DESCRIPTION OF THE DRAWINGS

FIG. 5 is a table showing exemplary game activity that may be responsive to exemplary combinations of control signals of the electronic swordfighting game apparatus of FIG. 1.

DETAILED DESCRIPTION OF THE DISCLOSURE

Electronic game apparatus that simulate swordfighting or fencing may each be operated by one or more participants or players. These electronic game apparatus may each include one or more controller units that are each adapted to be manipulated by a participant or player to provide control signals that are transmitted to a processor to determine a game activity. The processor and/or an audio-video processor may be adapted to transmit output signals representative of the game activity to a monitor device, such as a television set.

Figure 1:
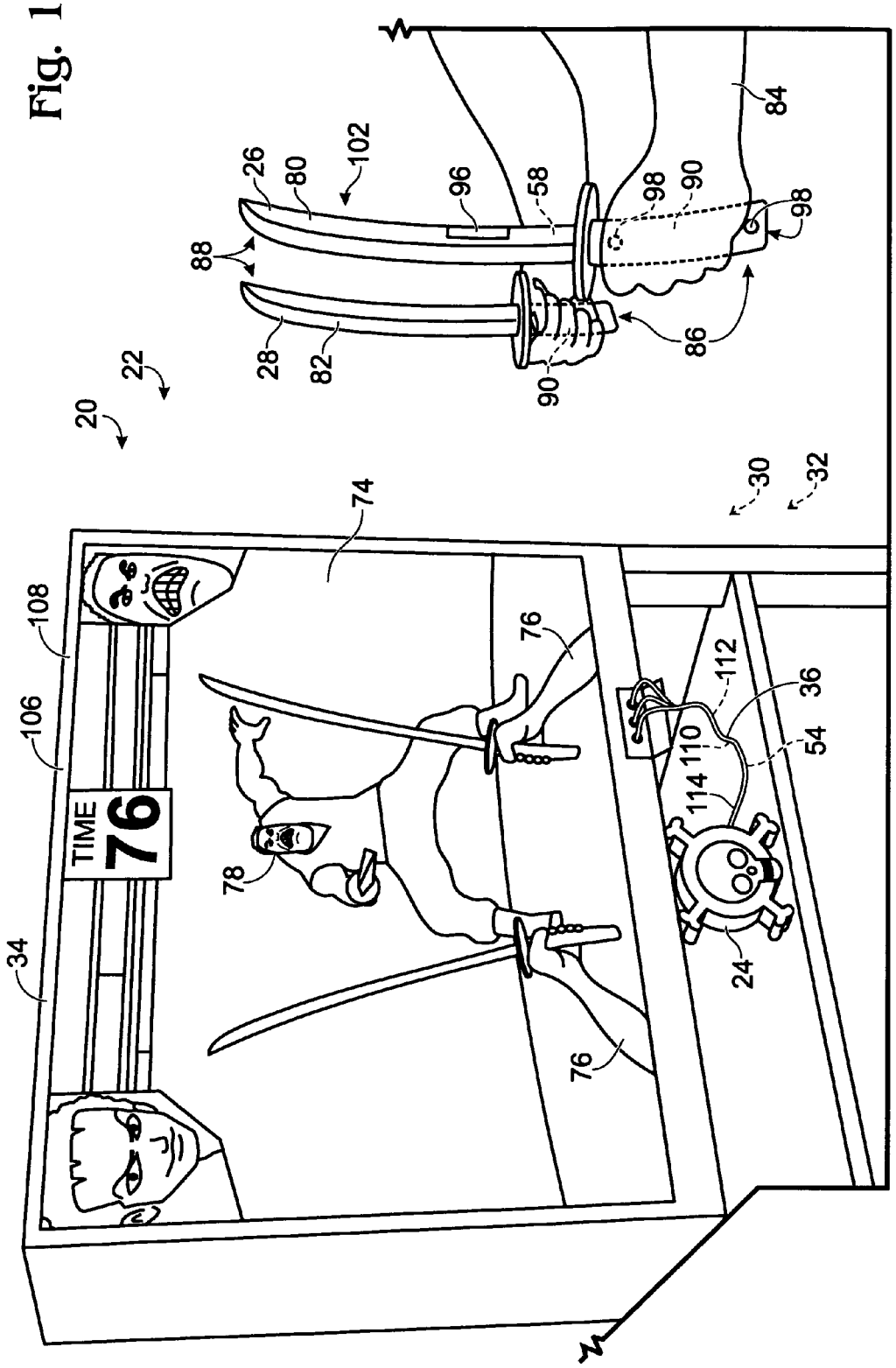
FIG. 1 is a perspective view of an exemplary electronic swordfighting game apparatus according to the present disclosure.

Turning now to the drawings, a schematic representation of an exemplary electronic game apparatus is shown in FIG. 1, and is indicated generally at 20. FIG. 1 shows an electronic swordfighting game apparatus 22, as an example of electronic game apparatus 20, that may provide a simulation of a swordfighting battle between a participant and a computer opponent. Other embodiments may simulate other activities such as boxing, wrestling, or the like. Electronic swordfighting game apparatus 22 may include a base member 24, a signal-emitting member 26, and a contacting member 28. Signal-emitting member 26 may be operatively coupled to the base member via an inter-unit linkage 30 that may include a wireless connection 32, represented in FIG. 1 by air as the medium of transmission of wireless communication signals. Base member 24 may also be operatively and electrically connected to a monitor device 34 by way of a monitor linkage 36.

Figure 2:
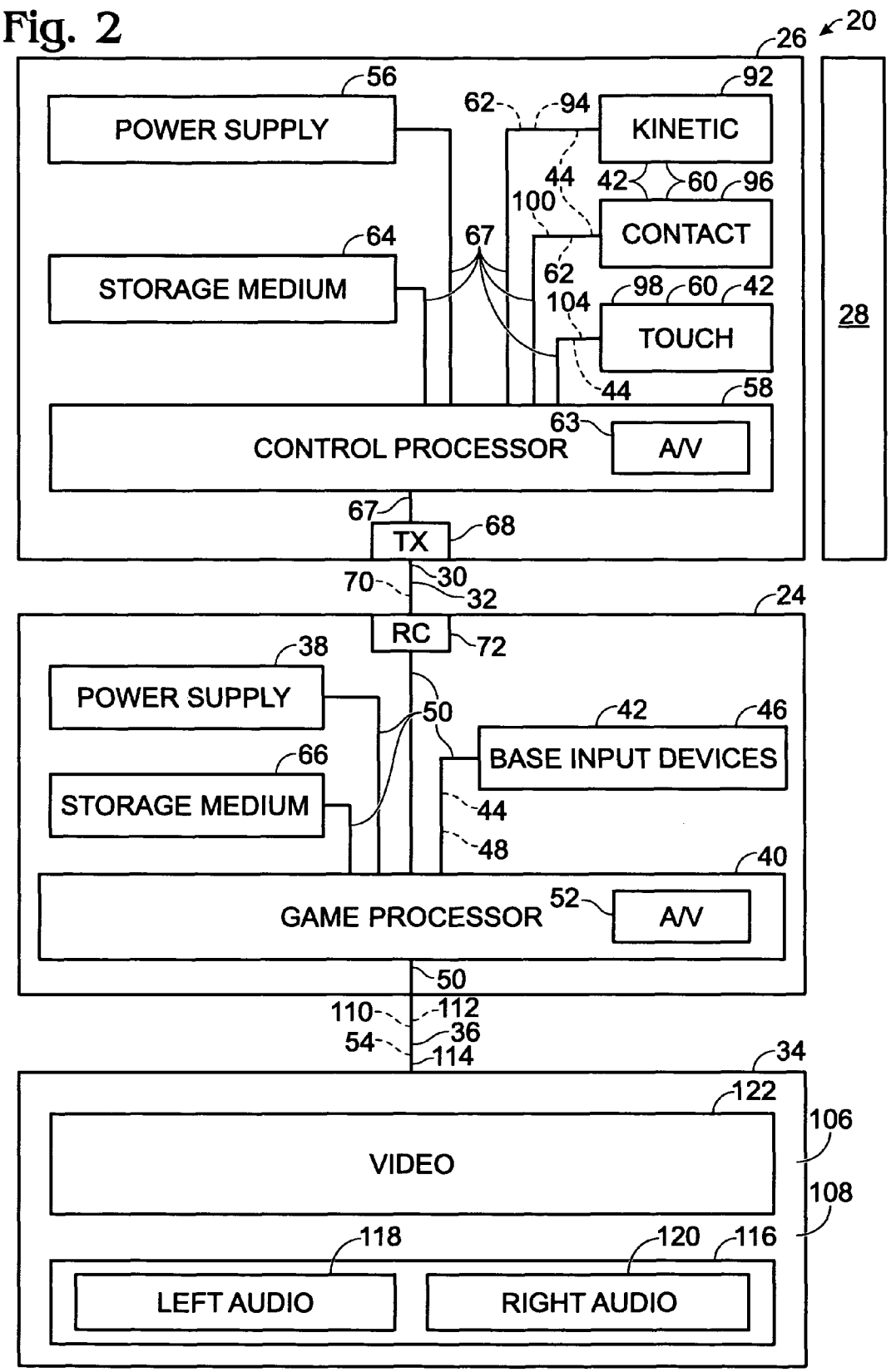
FIG. 2 is a schematic of an electronic game apparatus according to the present disclosure.

As particularly shown in FIG. 2, base member 24 may include a power supply 38 and a game processor 40. Power supply 38 may include of one or more batteries, an AC/DC converter, and the like. Game processor 40 may include one or more analog or digital circuits, logic units, or processors for operating programs stored as software in memory, and may include one or more distinct units in communication with each other.

Base member 24 may include a plurality of input devices 42 that are each adapted to produce one or more control signals 44. For example, one or more base input devices 46 may produce one or more base control signals 48. Base input devices 46 may include any combination of joysticks, trackballs, level switches, contact switches, and so forth. Base member 24 may further include a plurality of connectors 50 that may include a combination of cables, wires, and/or wireless connections that are adapted to transmit control signals 44 and/or power from other components of electronic game apparatus 20 to game processor 40.

Game processor 40 may be adapted to receive control signals 44 and to determine a game activity therefrom. The game processor may include an audio-video processor 52 adapted to determine output signals 54 representative of the game activity and to transmit the output signals to monitor device 34 along monitor linkage 36. Output signals 54 may include audio and/or video signals that may be rendered into sound and/or a visual display by a conventional television set.

Signal-emitting member 26 may include a power supply 56 and a control processor 58. Power supply 56 may include at least one of one or more batteries, an AC/DC converter, and the like. Control processor 58 may include one or more analog or digital circuits, logic units, or processors for operating programs stored as software in memory, and may include one or more distinct units in communication with each other. Control processor 58 may be coupled to a plurality of controller input devices 60 that may produce one or more controller signals 62. The controller input devices, including any combination of joysticks, trackballs, level switches, contact switches, and so forth, may be included in the plurality of input devices 42. Similarly, the controller signals may be included in the plurality of control signals 44 that may be transmitted to game processor 40 and used by the game processor to determine the game activity.

In some embodiments, control processor 58 may be adapted to perform some or all of the functions described in reference to game processor 40. In these embodiments, base member 24 may include an audio-video processor 63 as a separate processor that is adapted to produce and transmit the output signals. In other embodiments, the electronic game apparatus may not include a base member, and the control processor may include the audio-video processor.

Optionally, signal-emitting member 26 and/or base member 24 may each include a computer readable medium 64 or 66, respectively, such as memory components to store game parameters. Computer readable media 64 and 66 may each be either non-removable or removable in order to transfer parameters to other electronic game apparatus 20, and may each be a read-only medium or a read-write medium. Additionally or alternatively, the computer readable media may include one or more sequences of instructions that, when executed by one or more processors such as game processor 40 and/or control processor 58, electronic game apparatus 20 may play swordfighting and/or alternately themed games. Signal-emitting member 32 may further include a plurality of connectors 67 that may include a combination of cables, wires, and/or wireless connections that are adapted to transmit controller signals 62 and/or power from other components of electronic game apparatus 20 to control processor 58

Inter-unit linkage 30 may include any suitable connection between signal-emitting member 26 and base member 24. For example, it has been suggested previously that the inter-unit linkage may include wireless connection 32. Accordingly, signal-emitting member 26 may include a wireless transmitter 68 that may be adapted to transmit an electromagnetic energy signal 70. Electromagnetic energy signal 70 may include any suitable electromagnetic energy such as electric fields, magnetic fields, electromagnetic radiation at radio-frequency (RF), infrared radiation, or optical radiation. Base member 24 may include a wireless receiver 72 that is adapted to receive electromagnetic energy signals 70 from the signal-emitting unit. In other examples, signal-emitting member 26 and base member 24 may be configured to allow two-way wireless communication, or the inter-unit linkage may include a wired connection.

Signal-emitting member 26 and contacting member 28 may be used together during gameplay. Contacting member 28 may be manipulated by the user to activate at least one controller input device 60 on signal-emitting member 26. In other examples, contacting member may be configured like signal-emitting member 26 and may include one or more input devices 42.

Referring again to FIG. 1 and with continued reference to FIG. 2, electronic swordfighting game apparatus 22 may include play modes that allow any number of players, or that allow play of a single player against any number and variety of computer opponents. Specific combinations of control signals created by manipulation of input devices may correspond to actions of a player character, to actions of an opponent character, and to interactions of the player character with the opponent character, as will be described below. Accordingly, the output signals may include a visual depiction 74 including a visual depiction 76 of the player character and a visual depiction 78 of the opponent character. In some examples, the opponent character may be selectable from a group of available opponent characters. Visual depiction 74 may include other elements such as time, health, and/or strength indicators, special privileges, and the like. Signal-emitting member 26 and/or contacting member 28, in the form of swords 80 and 82, respectively, may each be adapted to be wielded or manipulated by a player 84. Swords 80 and 82 may each be elongate and extend from a first end 86 to a second end 88. First end 86 of each sword may include a handle 90 that may be grasped in a hand of player 84.

Figure 3:
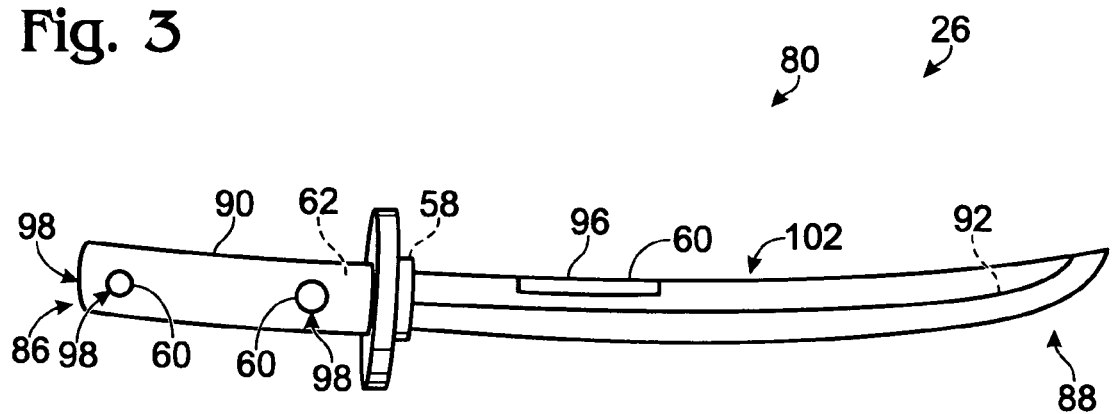
FIG. 3 is a plan view of the signal-emitting member of the electronic game apparatus of FIG. 1.

Sword 80, corresponding to signal-emitting member 26 is shown more particularly in FIG. 3. Sword 80 may include control processor 58 coupled to a plurality of controller input devices 60 that are each adapted to produce one or more controller signals 62. For example, the control processor may be coupled to one or more kinetic sensors 92 that are adapted to produce one or more kinetic control signals 94 that are cumulatively representative of one or more of an orientation of the signal-emitting member, a direction, a speed of motion, and/or an acceleration of the signal-emitting member. The kinetic sensors may include gravity switches, inertial switches, and/or other devices that are adapted to modify their electrical properties such as by creating an open circuit, a closed circuit, and/or a modified impedance, resistance, capacitance, and/or inductance when placed in a specific orientation or when set in linear, rotational, and/or other motion. Control processor 58 may receive inputs from any appropriate combination of kinetic sensors 92 to determine corresponding motion patterns of the signal-emitting member during gameplay.

Figure 4:
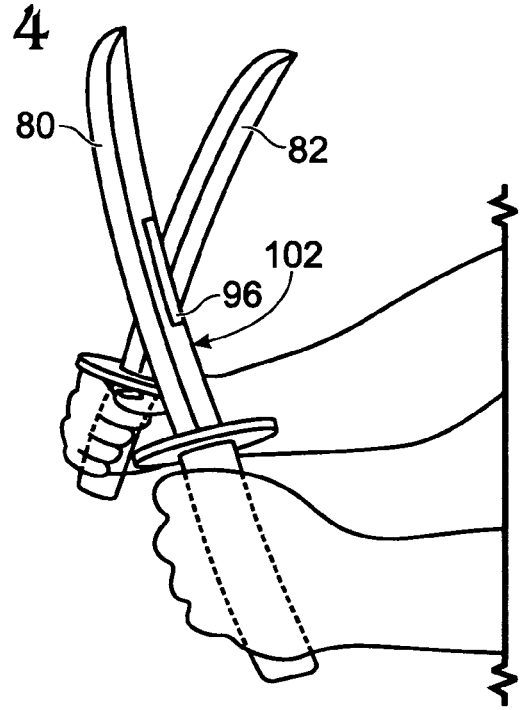
FIG. 4 is a partial perspective view of several of the components of the electronic game apparatus of FIG. 1.

The control processor may also receive signals from a contact sensor 96 and one or more touch sensors 98. Contact sensor 96 may be adapted to transmit contact control signal 100 when actuated by pressing contacting member 28 against the signal-emitting member, as shown in FIG. 4. Contact sensor 96 may be disposed at a position that is between first end 86 and second end 88 of signal-emitting member 26. Additionally or alternatively, contact sensor 96 may be disposed in different positions on signal-emitting member 26. For example, the signal-emitting member may include a side 102 that may be positioned facing the player when the player grasps the signal-emitting member, with the contact sensor disposed on the side.

In some examples, contact sensor 96, or other controller input devices 60, may be included with sword 82 (contacting member 28), or with another component of electronic swordfighting game apparatus 22, and may be adapted to transmit the contact control signal to the signal-emitting member. In other examples, multiple contact sensors may be used.

Touch sensors 98 may be adapted to transmit one or more touch control signals 104. The touch sensors may be disposed at one or more positions on or near handle 90 of the signal-emitting member. Accordingly, one or more of the touch sensors may be actuated by the hand of the player grasping the signal-emitting member in order to transmit one or more touch control signals 104 to affect desired game activities, as will be discussed below.

In the example shown in FIG. 1, sword 80 (signal-emitting member 26) is grasped in the left hand of player 78, and sword 82 (contacting member 28) is grasped in the right hand. In some examples, sword 80 may include one or more controller input devices 60 that transmit controller signals 62 to game processor 40 or control processor 58 that correspond to wielding sword 80 (signal-emitting member 26) in the right hand instead of the left hand.

As has been suggested previously, control processor 58 may be configured to perform the operations described above in reference to game processor 40. The control processor may be adapted to receive one or more of the plurality of control signals 44, including controller signals 62 (kinetic control signals 94, contact control signals 100, and touch control signals 104). The control processor may be adapted to determine the resultant game activity from the plurality of control signals.

Signal-emitting member 26 may be operatively coupled to base member 24 via inter-unit linkage 30, such as by wireless connection 32. As has been discussed, the wireless connection may use suitable electromagnetic energy such as electric fields, magnetic fields, and electromagnetic radiation operating at radio-frequency (RF), infrared, or optical regimes. Optionally, inter-unit linkage 30 may include a single-wired or wireless connection, or a combination of such connections.

As has been discussed previously, base input devices 46 may be adapted to produce one or more control signals 44 that may be transmitted to the game processor to determine the game activity. Some non-exclusive examples of base input devices may include one or more buttons, switches, sliders, dials, and the like. In some examples, one or more base control signals 48 may be transmitted to audio-video processor 52 to determine the type of output signals 54 that the audio-video processor may generate.

As has been mentioned, monitor device 34 may include a conventional audio-video monitor device 106 such as a television set 108, or a suitable alternative. Accordingly, output signals 54 may include an audio signal 110 and a video signal 112 that audio-video processor 52 or 63 may transmit to the monitor device via a suitable wired or wireless communications link, such a multi-conductor cable 114. For example, a conventional RCA or phono cabling may operatively couple the base unit to the monitor device. Audio signal 110 may have one or more channels or tracks to produce, for example, either monophonic or stereophonic sound.

Similarly, video signal 112 may be formatted using conventional composite video encoding, conventional RGB encoding, or S-Video encoding. Multi-conductor cable 114 may therefore include any appropriate number of conductors, according to the format of the output signals. In other embodiments, output signals 54 may be transmitted to television set 108, or a suitable alternative, via a coaxial cable that is operatively connected to the antenna jack of the television set, or via any other connections known in the art.

Television set 108 may include an audio unit 116 having a left audio source 118 and a right audio source 120, and a video unit 122, which may include a cathode ray tube (CRT) display, an LCD display, or suitable alternative. Audio unit 116 and video unit 122 may be adapted to render audio signals 110 and video signals 112, respectively, as audible sound and visual images of visual depiction 74.

Electronic swordfighting game apparatus 22 may provide a plurality of play modes that provide a player a way to learn game skills required by one or more competitive modes, in which the player, as the player character, competes against one or more animated opponent characters, or against a second player. Accordingly, the depicted embodiment may include a tutorial or "training" game mode in which the player may practice offensive and/or defensive swordfighting maneuvers using signal-emitting member 26 and/or contacting member 28. Different swordfighting maneuvers may correspond to different combinations of control signals 44, for example controller signals 62.

For example, player 78 may wield swords 80 and 82 to cause control processor 58 to receive kinetic control signals 94 that are representative of various kinetic values that may each include an orientation and/or a motion of the signal-emitting member. Upon receiving these kinetic control signals, control processor 58 may determine a game activity in which the player character wields a sword. Optionally, output signals 54 may be representative of visual depiction 74, which may include a visual depiction 76 of the player character wielding a visual depiction 124 of one or more swords. An orientation of the sword depiction 124 representative of signal-emitting member 26 may correspond to the orientation of the signal-emitting member. Moreover, the visual depiction 76 of the player character may perform offensive and/or defensive swordfighting maneuvers with sword depictions 124 corresponding to the kinetic control signals, the contact control signals, and/or the touch control signals.

FIG. 5 shows a table 150 of exemplary game activities that game processor 40 may determine as a result of receiving specific exemplary combinations of control signals 44. In visual depiction 74 shown in FIG. 1, the visual depiction of the player character is standing generally upright and motionless with the visual depiction of the swords in a generally upright position. This position may be referred to as a "ready" position, and control processor 58 may determine a game activity in which the player character assumes this position when the combination of control signals includes generally upright and still kinetic control signals, and non-actuated contact control signals and non-actuated touch signals. Player 78 may effect this combination of control signals by holding swords 80 and 82 still in a generally upright position, or "ready" position, while not actuating the contact sensors and the touch sensors.

From this "ready" position, if the player swings sword 80 (signal-emitting member 26) generally downward, the signal-emitting member may transmit kinetic control signals indicative of this action. Correspondingly, control processor 58, with no changes to the states of the contact sensor and the touch sensor, may determine a game activity in which depiction 76 of the player character swings depiction 112 corresponding to sword 80 in a similar slashing motion.

In another example, player 78 may manipulate swords 80 and 82 in a way such that sword 82 (contacting member 28) actuates contact sensor 96 to produce contact control signal 100. After receiving a corresponding signal, control processor 58, may determine a game activity in which the depiction of the player character assumes a defensive posture to parry or block offensive maneuvers of the opponent character. Optionally, one or more opponent characters may be able to perform offensive attack maneuvers against which the player's parry maneuver is not effective. In some embodiments, if the player actuates the contact sensor at substantially the moment that the opponent character performs an offensive attack maneuver, the opponent character may be stunned temporarily, or otherwise rendered vulnerable to one or more offensive maneuvers from the player character.

As has been discussed, the player may actuate touch sensors 98 to affect desired game activities. In some examples, the control processor may be adapted to determine a first game activity in response to touch control signals 104 when kinetic control signal 94 represents a first orientation value of sword 80 (signal-emitting-member 26). In these examples, the control processor may be adapted to determine a second game activity in response to the touch control signals when the kinetic control signal represents a second orientation value of the signal-emitting member.

For example, the player may actuate the touch sensor while moving the signal-emitting member in a manner representing an offensive maneuver. In this instance, the control processor may determine a first game activity including actions of the player character based upon the control signals, actions of the opponent character, and interactions of the opponent character with the player character. Specifically, the player character may perform a more powerful attack maneuver than swinging the signal-emitting member without actuating the touch sensor. This more powerful attack may afflict more damage to the opponent character, and/or may be more difficult for the opponent character to block effectively.

The player may also actuate the touch sensor with the signal-emitting member at rest in a ready position with second end 88 pointed generally upwards. In this instance, the control processor may determine a second game activity in which the player character may receive "special" game privileges, which may have been earned in previously game activities. For example, the player may receive medicine to heal wounds acquired in combat, afflict wounds on the opponent character, or call upon a partner character to engage in team combat with the opponent character. In this latter example, the second game activity may include actions of the player character based upon the control signals, actions of the opponent character, actions of the partner character, and interactions of the opponent character with a team formed by the player character and the opponent character. Sword 80 may include other touch sensors 98 that may produce other touch control signals 104 in response to which the game processor determines other game activities, such as levels of difficulty, game modes, options, and the like.

Electronic swordfighting game apparatus 22 may include a tutorial or "spar" game mode in which an animated mentor character coaches the player to execute the various offensive and defensive swordfighting maneuvers. Other play modes may include various ways of conducting swordfighting battles with one or more animated opponent characters.

For example, electronic swordfighting game apparatus 22 may include an "adventure" mode where the player conducts a series of swordfights with a progression of opponent characters, with the requirement that the player defeat each opponent character before progressing to the next, more challenging opponent character. Criteria for defeating an opponent character may include the infliction of a predetermined amount and/or severity of battle-related injuries upon the opponent character before the opponent character inflicts a sufficient amount and/or severity of battle-related injuries upon the player. The amount and/or severity of injuries required to defeat each opponent character may vary from character to character. Additionally or alternatively, the amount and/or severity of injuries required to defeat the player may vary with the player's level of advancement within the game. A player who has defeated the final opponent character has conquered the game.

Electronic swordfighting game apparatus 22 may include a "battle" mode and/or a "survive" mode. In "battle" mode, a player may select an opponent from a list of available opponents. In some embodiments, the list may comprise the opponents that the player has defeated in the "adventure" mode. In "survive" mode, the player may compete against a series of animated opponents until he defeats them all, or until the player incurs an excess of battle-related injuries. In some embodiments, the player may be able to heal some or all battle-related injuries as a result of successfully completing game activities, such as defeating opponents. Player 78 may select modes of play using one or more input devices 42, such as touch sensors 98.

In either "battle" mode or "survive" mode, the player character may be able to perform different maneuvers and/or may have different offensive or defensive capabilities depending on game mode or on previous play history. In these competitive one-player modes, game processor 40 may determine actions of opponent character. These actions may follow a predetermined pattern, may follow a random pattern, and/or may be in response to one or more actions of player character.

Opponent character may be selected from a plurality of opponent characters that may each employ a unique set of "special" offensive and/or defensive swordfighting maneuvers, in addition to a "standard" set of maneuvers that all opponent characters may employ. The capabilities of player character may overlap with the capabilities of the plurality of opponent characters. In some examples, the player character may earn the "special" capabilities of each of the opponent characters that the player character has defeated. In these examples, electronic swordfighting game apparatus 22 may be adapted store a history of game activities on computer readable medium 64 or 66. In some examples, the background of visual depiction 74 may have different characteristics corresponding to the identity of opponent character.

This disclosure may include one or more independent or interdependent inventions directed to various combinations of features, functions, elements and/or properties. While examples of apparatus and methods are particularly shown and described, many variations may be made therein. Various combinations and sub-combinations of features, functions, elements and/or properties may be claimed in one or more related applications. Such variations, whether they are directed to different combinations or directed to the same combinations, whether different, broader, narrower or equal in scope, are regarded as included within the subject matter of the present disclosure.

The described examples are illustrative and directed to specific examples of apparatus and/or methods rather than a specific invention, and no single feature or element, or combination thereof, is essential to all possible combinations. Thus, any one of various inventions that may be claimed based on the disclosed example or examples does not necessarily encompass all or any particular features, characteristics or combinations, unless subsequently specifically claimed. Where "a" or "a first" element or the equivalent thereof is recited, such usage includes one or more such elements, neither requiring nor excluding two or more such elements. Further, ordinal indicators, such as first, second or third, for identified elements are used to distinguish between the elements, and do not indicate a required or limited number of such elements, and do not indicate a particular position or order of such elements unless otherwise specifically indicated.

INDUSTRIAL APPLICABILITY

The methods and apparatus described in the present disclosure are applicable to toys, games, and other devices, and industries in which amusement devices are used.

We claim:

1. An electronic game apparatus for providing a game activity on a monitor device, comprising:
    a contacting member adapted to be manipulated by a first hand of a user;
    a signal-emitting member adapted to be manipulated by a second hand of the user, the signal-emitting member including one or more kinetic sensors each adapted to produce a kinetic control signal representative of at least an orientation of the signal-emitting member, the signal-emitting member further including at least one contact sensor adapted to be actuated by the user bringing the contacting member into contact with the signal-emitting member to produce a contact control signal;
    a processor responsive to the one or more kinetic control signals and the contact control signal and adapted to determine the game activity corresponding to the one or more kinetic control signals and the contact control signal; and
    an audio-video processor coupled to the processor and adapted to produce and transmit audio-video output signals representative of the game activity to the monitor device.

2. The electronic game apparatus of claim 1, wherein the game activity includes actions of a player character based upon at least one of the one or more kinetic control signals and the contact control signal, actions of an opponent character, and interactions of the player character with the opponent character.

3. The electronic game apparatus of claim 1, wherein the output signals are representative of a depiction of the signal-emitting member in an orientation that corresponds to the orientation of the signal-emitting member.

4. The electronic game apparatus of claim 1, wherein the signal-emitting member transmits the one or more kinetic signals to the processor through a wireless connection.

5. The electronic game apparatus of claim 1, wherein the signal-emitting member is elongate and extends from a first end to a second end, and wherein the contact sensor is disposed at a position that is between the first end and the second end.

6. The electronic game apparatus of claim 1, wherein the signal-emitting member includes a handle that is adapted to be grasped in a hand of the user.

7. The electronic game apparatus of claim 1, wherein the signal-emitting member has a side that is positioned facing the user when the user grasps the signal-emitting member, and wherein the contact sensor is disposed on the side.

8. The electronic game apparatus of claim 1, wherein the signal-emitting member further includes a touch sensor that is adapted to be actuated manually to produce a touch control signal, and wherein the processor is adapted to determine the game activity based at least in part on the touch control signal.

9. The electronic game apparatus of claim 8, wherein the processor is adapted to determine a first game activity in response to receiving the touch control signal when the kinetic control signals represent a first orientation value, and to determine a second game activity in response to receiving the touch control signal when the kinetic control signals represent a second orientation value.

10. The electronic game apparatus of claim 9,
    wherein the first game activity includes actions of a player character based upon at least one of the kinetic control signals and the contact control signal, actions of an opponent character, and interactions of the opponent character with the player character; and
    wherein the second game activity includes actions of a player character based upon at least one of the kinetic control signals and the contact control signal, actions of an opponent character, actions of a partner character, and interactions of the opponent character with a team formed by the player character and the partner character.

11. A method of operating an electronic game apparatus, comprising:
    manipulating a signal-emitting member using a first hand;
    producing at least one kinetic control signal cumulatively representative of at least an orientation of the signal-emitting member;
    transmitting from the signal-emitting member the at least one kinetic control signal;
    receiving the at least one kinetic control signal at a processor remote from the signal-emitting member;
    manipulating a contacting member using a second hand to bring the contacting member into contact with the signal-emitting member;
    producing a contact control signal representative of the contact of the contacting member with the signal-emitting member;
    transmitting from the signal-emitting member the contact control signal;
    receiving the contact control signal at the processor;
    determining a game activity based at least in part upon the at least one of the at least one kinetic control signal and the contact control signal; and
    transmitting output signals representative of the game activity to a monitor device.

12. The method of claim 11, wherein determining a game activity includes determining a game activity that includes actions of a player character based upon one or more of the at least one kinetic control signal and the contact control signal, actions of an opponent character, and interactions of the opponent character and the player character.

13. The method of claim 11, wherein transmitting output signals includes transmitting output signals that are representative of a depiction of the signal-emitting member in an orientation that corresponds to the orientation of the signal-emitting member.

14. The method of claim 11, wherein receiving the at least one kinetic control signal and receiving the contact control signal each include receiving the at least one kinetic control signal and the contact control signal via one or more wireless connections.

15. The method of claim 11, wherein manipulating a contacting member includes manipulating the contacting member to actuate a contact sensor included with the signal-emitting member.

16. The method of claim 11, further comprising:
    actuating a touch sensor on the signal-emitting member;
    transmitting from the signal-emitting member a touch control signal in response to actuation of the touch sensor; and
    receiving the touch control signal at the processor, and wherein determining a game activity includes:
    determining a first game activity when the orientation represents a first orientation value, and determining a second game activity when the orientation represents a second orientation value.

17. The method of claim 15, wherein the signal-emitting member is elongate and extends from a first end to a second end, and wherein the contact sensor is disposed at a location between the first end and the second end.

18. The method of claim 15,
wherein the signal-emitting member includes a side on which contact sensor is mounted;
wherein the method further includes facing the side toward user when the user holds the signal-emitting member; and
wherein manipulating a contacting member includes manipulating the contacting member to contact the side.

19. The method of claim 16,
wherein determining a first game activity includes determining a first game activity that includes actions of a player character based upon one or more of the at least one kinetic control signal and the contact control signal, actions of an opponent character, and interactions of the opponent character and the player character; and
wherein determining a second game activity includes determining a second game activity including actions of a player character based upon the one or more of the at least one kinetic control signal and the contact control signal, actions of an opponent character, actions of a partner character, and the interactions of the opponent character and a team formed by the player character and the partner character.

20. A non-transitory computer-readable medium comprising one or more sequences of instructions to play an electronic game, wherein execution of the one or more sequences of instructions by one or more processors causes the one or more processors to:

receive a plurality of control signals including at least one or more kinetic control signals, a contact control signal, and a touch control signal, wherein the one or more kinetic control signals cumulatively correspond to an orientation of a signal-emitting member using a first hand, and the contact control signal corresponds to bringing a contacting member into contact with the signal-emitting member with a second hand of the user to produce a contact control signal;

determine a game activity based upon and in response to the one or more kinetic control signals including:
determining, when the one or more kinetic control signals represent a first kinetic control signal value, a first game activity including actions of a player character based upon the one or more kinetic control signals, actions of an opponent character, and interactions of the opponent character and the player character, and
determining, when the one or more kinetic control signals represent a second kinetic control signal value, a second game activity including actions of a player character based upon the one or more kinetic control signals, actions of a partner character, actions of an opponent character, interactions of the opponent character and a team formed by the player character and the partner character; and transmit one or more output signals representative of the game activity to a monitor device.

21. The computer-readable medium of claim 20, wherein the output signals include a depiction of the signal-emitting member that corresponds to the orientation of the signal-emitting member.

22. The computer readable medium of claim 20, wherein the game activity is also based upon and in response to the contact control signal.

* * * * *